United States Patent
Settles

(10) Patent No.: US 6,247,101 B1
(45) Date of Patent: Jun. 12, 2001

(54) TAGGED ACCESS SYNCHRONOUS BUS ARCHITECTURE

(75) Inventor: Curtis R. Settles, Fort Collins, CO (US)

(73) Assignee: LSI Logic Corporation, Milipitas, CA (US)

( * ) Notice: Subject to any disclaimer, the term of this patent is extended or adjusted under 35 U.S.C. 154(b) by 0 days.

(21) Appl. No.: 09/108,347

(22) Filed: Jul. 1, 1998

(51) Int. Cl.⁷ .................................................. G06F 12/00
(52) U.S. Cl. .......................... 711/145; 711/158; 711/163; 711/151
(58) Field of Search .................................... 711/145, 151, 711/156, 158, 154, 163, 166; 710/105, 125, 107; 370/439

(56) References Cited

U.S. PATENT DOCUMENTS

| | | | |
|---|---|---|---|
| 4,794,521 | 12/1988 | Ziegler et al. | 364/200 |
| 5,168,568 | * 12/1992 | Thayer et al. | 710/125 |
| 5,208,914 | 5/1993 | Wilson et al. | 395/275 |
| 5,257,356 | 10/1993 | Brockmann et al. | 395/725 |
| 5,313,594 | * 5/1994 | Wakerly | 710/105 |
| 5,442,757 | 8/1995 | McFarland et al. | 395/375 |
| 5,448,742 | * 9/1995 | Bhattacharya | 711/154 |
| 5,524,268 | 6/1996 | Geldman et al. | 395/825 |
| 5,539,890 | 7/1996 | Rahman et al. | 395/375 |
| 5,544,351 | 8/1996 | Lee et al. | 395/550 |
| 5,592,631 | 1/1997 | Kelly et al. | 395/293 |
| 5,603,066 | 2/1997 | Krakirian | 395/894 |
| 5,608,879 | 3/1997 | Cooke | 395/290 |
| 5,903,283 | * 5/1999 | Selwan et al. | 345/521 |
| 5,974,514 | * 10/1999 | Andrewartha et al. | 711/166 |
| 5,995,513 | * 11/1999 | Harrand et al. | 370/439 |
| 6,009,489 | * 12/1999 | Mergard | 710/107 |

* cited by examiner

Primary Examiner—Matthew Kim
Assistant Examiner—Fred F. Tzeng

(57) ABSTRACT

Reusable tags are assigned to read and write requests on a tagged access synchronous bus. This allows multiple reads to be queued and overlapped on the tagged access synchronous bus to maximize data transfer rates. Writes are buffered to similarly allow multiple writes to be over-lapped. All data transfers on the tagged access synchronous bus typically would default to a cache block amount of data, with critical word first and early termination capabilities provided to permit processor execution to proceed without waiting for an entire cache block to be loaded. The tagged access synchronous bus architecture thus allows the system to take full advantage of high speed memory devices such as SDRAMs, RDRAMs, etc. while decoupling the bus data transfers from processor execution for increased overall system performance.

37 Claims, 5 Drawing Sheets

TAGGED ACCESS SYNCHRONOUS BUS ARCHITECTURE

BACKGROUND OF THE INVENTION

1. Technical Field

The present invention relates generally to system bus architectures for data processing systems and in particular to system bus architectures for systems having multiple devices utilizing the system bus for data access. Still more particularly, the present invention relates to a synchronous bus architecture employing reusable tags for system bus transactions to obviate the need for wait states.

2. Description of the Related Art

Memories, particularly dynamic random access memories (DRAMs) operate at optimal performance when blocks of data are transferred, as illustrated in Table I below.

TABLE I

| Peak Access Rates | Data Block Size (MB/sec) | | |
|---|---|---|---|
| DRAM TYPE | 2 | 4 | 8 |
| EDO (60 ns) best case | 133 | 133 | 133 |
| EDO (60 ns) worst case | 59 | 82 | 101 |
| SDRAM (100 MHz) best case | 400 | 400 | 400 |
| SDRAM (100 MHz) worst case | 66 | 114 | 177 |
| SDRAM (125 MHz) best case | 500 | 500 | 500 |
| SDRAM (125 MHz) worst case | 83 | 142 | 222 |

In the above figures, EDO DRAM assumes 15 ns control clock period. Best case assumes same page access for every block so RAS is held low with no precharge and a 30 ns CAS cycle time. Worst case assumes 60 ns RAS to first data, plus 30 nS CAS cycle for each additional data and 45 ns precharge on every access. SDRAM assumes a RAS to CAS of 3 clocks, a CAS latency of 3 clocks, and a precharge of 4 clocks. Best case assumes continuous access of data the same as with the EDO DRAM. Worst case assumes RAS to CAS of 3 clocks, CAS to data of 3 clocks, 1 clock per data word, and 4 clocks for precharge on every access for a total of 12, 14 and 18 clocks respectively. A sustained rate on SDRAM with 8 word block size and 50% of the time being the same bank access with precharge (worst case) and 50% of the time being bank interleave (close to best case) and including refresh would be 332 MB/sec.

Similar to memory devices, networks and data storage systems provide optimal performance when handling blocks of data. Processors, on the other hand, typically perform single word accesses during execution of instructions and generally have very limited block data movement capability.

In most system architectures, memories function primarily as slaves (devices which service data transfer requests) on the system bus, while processors generally function primarily as masters (devices initiating data transfers). In such architectures, the device being read on the system bus (the slave) determines the amount of time required to complete a data access. If the time required for a particular data access is greater than the normal read cycle time, wait states are typically generated to the device initiating the data access (the master) by the device containing the desired data (the slave). These wait states are wasted bus cycles which could be utilized by another master device on the bus.

Even though the optimal performance characteristics of memories, which are typically bus slaves, and processors, which are usually bus masters, are in conflict with each other, the system bus architecture generally follows that of the processor, even in systems where high data throughput is paramount.

Table I illustrates the performance gains achieved by utilizing synchronous dynamic random access memory (SDRAMs) rather than conventional, page mode EDO DRAMs. The 60 ns EDO DRAMs and the 100 MHz SDRAMs have an equivalent RAS to data access time, while the 125 MHz SDRAMs represent a performance increase. A hidden performance increase is the ability to address banks separately in the SDRAM, effectively overlapping the RAS-to-data time of one bank with block data transfer of another bank. In order to take advantage of this feature, however, the SDRAM controller needs to know the addresses for future reads and/or writes in advance, a feature which is not supported by standard microprocessor bus architectures. A possible exception is the ability of some processors to buffer writes, with write commands being queued to be written to memory. In order to take full advantage of the ability of SDRAMs to overlap accesses, an architecture is required which buffers both reads and writes, allowing many operations to be queued at once.

In order to avoid wasting bus cycles on wait states, the slave must receive the access request and address from the master, then the master and slave must release the bus for use by other devices and complete the access later, after the slave has had time to retrieve the requested data. One approach to implementing this requirement is to permit a bus master to disconnect from the bus after transmitting an address, with the intent of later returning to read the requested data from the slave device. However, this approach suffers from the disadvantage of inability of the bus master to determine when the slave device is ready. Thus, the bus master could reconnect too early, before the slave device is ready with the requested data, thereby wasting bus cycles and requiring wait states or a second disconnect/reconnect.

It would be desirable, therefore, to provide a bus architecture permitting multiple devices to act as bus masters without the need for wait states. It would further be advantageous for reads and writes to be fully buffered, and for address and data tenures of bus transactions to be decoupled.

SUMMARY OF THE INVENTION

Reusable tags are assigned to read and write requests on a tagged access synchronous bus. This allows multiple reads to be queued and overlapped on the tagged access synchronous bus to maximize data transfer rates. Writes are buffered to similarly allow multiple writes to be over-lapped. All data transfers on the tagged access synchronous bus typically would default to a cache block amount of data, with critical word first and early termination capabilities provided to permit processor execution to proceed without waiting for an entire cache block to be loaded. The tagged access synchronous bus architecture thus allows the system to take full advantage of high speed memory devices such as SDRAMs, RDRAMs, etc. while decoupling the bus data transfers from processor execution for increased overall system performance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
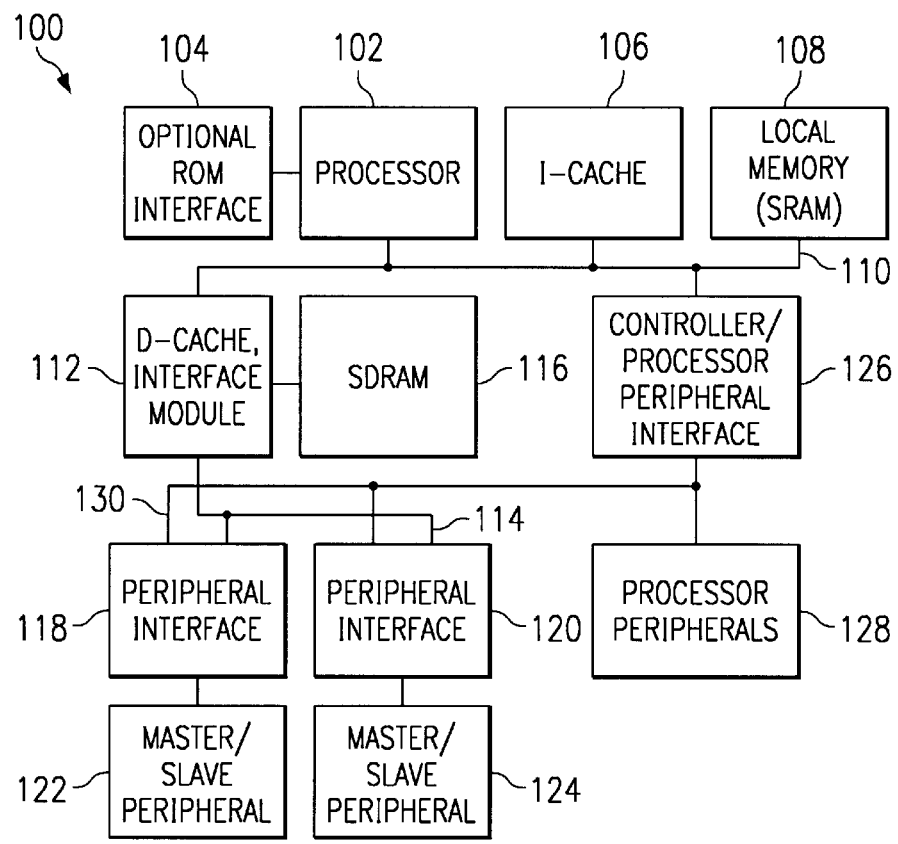
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 includes a processor 102. Processor 102 is optionally connected to a read-only memory (ROM) interface 104. Processor 102 is also connected to an instruction cache 106 and optionally to a local memory 108 via processor local bus 110. Processor 102 may therefore use the synchronous dynamic random access memory (SDRAM) 116 for instructions, or may utilize I-Cache 106, which is located on processor local bus 110 and is not accessible from the tagged access synchronous bus. Local memory (SRAM) 108 is optionally provided on processor local bus 110 to allow processor 102 to load interrupt vectors, interrupt handlers, or time-critical code in on-board memory to give processor 102 the minimum interrupt latency and a deterministic interrupt handling time.

In accordance with the present invention, connected to processor local bus 110 is data cache and tagged access synchronous bus interface module 112. Interface module 112 is connected to SDRAM 116, providing an interface between SDRAM 116 and processor local bus 110. Interface module 112 is connected to tagged access synchronous bus 114, which connects, via peripheral interfaces 118 and 120 to peripheral devices 122 and 124. The construction and operation of interface module 112, tagged access synchronous bus 114, SDRAM 116, peripheral interfaces 118 and 120, and peripherals 122 and 124 is described in further detail below.

Also connected to processor local bus 110 is controller and processor peripheral interface 126, connected to processor peripherals 128 such as interrupt controller, timers, etc., which allows processor 102 to respond to interrupts independent of the needs of tagged access synchronous bus 114. Controller 126 is also connected to processor peripheral bus 130, providing command and status signals to peripherals 122 and 124 connected to tagged access synchronous bus 114. System data transfer needs from peripherals 122 and 124 are handled by tagged access synchronous bus 114, which is subject to layout considerations as discussed below. Therefore, control of peripheral devices 122 and 124 acting as bus masters or slaves on bus 114 should be on processor peripheral bus 130, which transfers far less information and need not necessarily even be a 32 bit bus. Processor peripheral bus 130 may span the device chip and run at a much lower rate than processor local bus 110 or tagged access synchronous bus 114.

The embodiment depicted in FIG. 1 is presented merely for the purposes of explaining the invention and is not intended to imply architectural limitations. Those skilled in the art will recognize that many variants of the embodiment depicted may be utilized in connection with the present invention. For example, additional peripheral interfaces and peripheral devices may be connected to tagged access synchronous bus 114.

Figure 2:
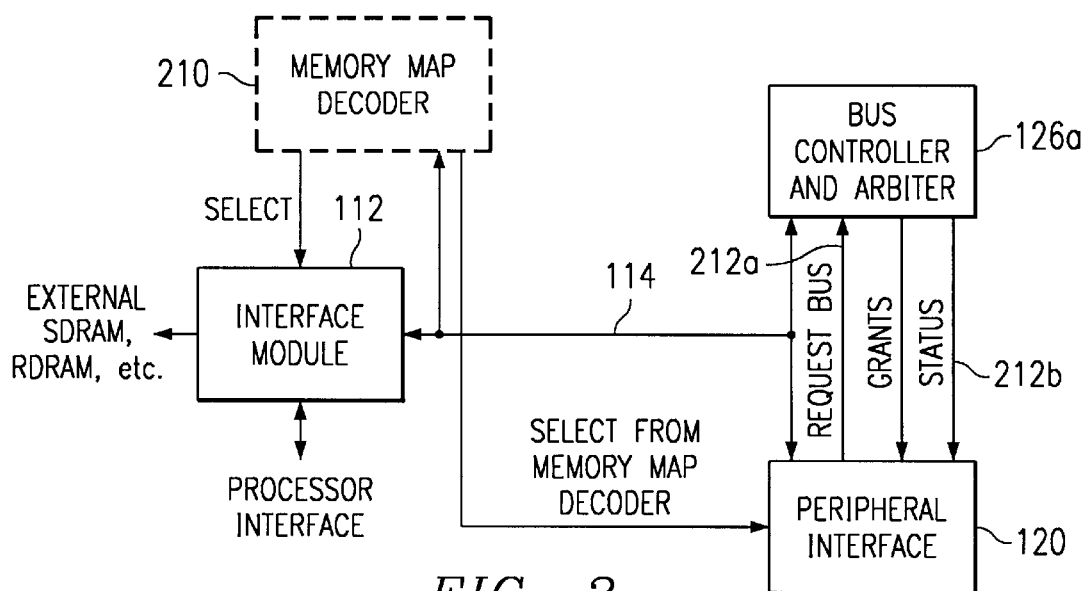
FIG. 2 is a block diagram of data transfer components for a tagged access synchronous system bus in accordance with a preferred embodiment of the present invention.

Referring to FIG. 2, a block diagram of data transfer components for a tagged access synchronous system bus in accordance with a preferred embodiment of the present invention is illustrated. These components are employed within data processing system 100 depicted in FIG. 1 to implement a tagged access synchronous bus.

The architecture of the present invention employs a bus controller which issues a tag for each address on the address bus. This tag is a number much smaller than the address, typically 3 or 4 bits, and is therefore much easier to compare in logic. A bus master, such as a processor, reads the tag and uses it to compare against the tag currently associated with the data on the data bus. When the tag matches, the bus master knows that the data is the data requested by a previously initiated data request. This eliminates the need for wait states since multiple addresses may be issued prior to completion of any individual read or write. Additionally, logic is simplified because only a 3 or 4 bit number need be compared instead of the entire 32-bit address. Such a small number allows the data bus to effectively have an address associated with it, so that the slave device controls the response rather than the bus master reissuing the address. The result is that the master delegates it's priority and privileges to the slave. This also saves cycles on the address bus, permitting memory controllers to optimize for bank or page access, and significantly increasing data throughput of the bus.

To support buffered writes and tagged reads, the address transactions must be dissociated from the data transactions. This actually gives an asynchronous nature to the bus, replacing the traditional "wait state" or master/slave ready signal. The architecture assumes that all devices on the bus are designed to work with blocks of data, such that an address placed on the bus will typically involve reading or writing a block of data. Peripherals within the system are assumed to access data sequentially, so that when a peripheral issues an address, a block of data equivalent to a cache line is transferred. The only exceptions occur at the beginning or end of a data packet, where only a partial block may be needed. Also, the processor typically accesses data in a more random fashion and may not require a full cache line. In either of these case, the bus will support critical word first and early termination.

Write requests from a peripheral are the simplest to support under the tagged access synchronous bus architecture, since the master (peripheral) requests the write address bus and, when acknowledged, places the beginning address on the bus with a write status. The master would then request the write data bus and, when acknowledged, write the block of data, typically one word per cycle. The addressed slave would be responsible for buffering the block. The write request is tagged by the bus controller/arbiter, with the slave device monitoring the data bus for data being written with the assigned tag.

Tagged read requests on a tagged access synchronous bus present a slightly more complex problem since different devices will respond in different amounts of time. To avoid waiting or idling the bus, as is done in current architectures, the read request is tagged. The read address bus is requested and, when acknowledged, the starting block address (the address of the first word required) is placed on the read address bus together with a read status. The system controller's bus controller/arbiter assigns a reusable tag, a unique 3 or 4 bit number, and a 2 bit priority to the address. (Although not described above, the system controller actually tags all accesses on the tagged access synchronous bus). The master on the read request then monitors the read data bus for data being written with the assigned tag. When the tag appears, the master reads the data.

Once a block has completed the transfer on either a write or read request, the arbiter will mark the assigned tag as ready for reuse. If the tagged access does not complete within a predefined period, the arbiter may place the tag on the address tag and status bus and assert a bus error, notifying the master of what is likely an invalid address. The time between an address being issued and the data being placed on the bus is not fixed, but is controlled by the tagged access response, creating a replacement for the traditional "wait state." Since the goal is to optimize the SDRAM for interleaving banks and same page accesses, it is possible for a bus master to place two addresses on the bus and receive data for the second address first. This must be taken into consideration in the peripheral interface design, or the peripheral must issue only one address at a time. Furthermore, for the purpose of supporting multiple simultaneous accesses, the bus master/peripheral is given two levels of priority on a request and the ability to raise the priority level of a previously issued tag.

The bus architecture of the present invention can interface several master/slave peripheral devices through tagged access synchronous bus interface module 112 connected to the tagged access synchronous bus 114, with different interfaces implemented for different peripheral protocols. These master/slave peripheral devices may also function as slaves for peer-to-peer communications. Bus controller and arbiter logic 126a within controller 126 is also connected to tagged access synchronous bus 114, as is tagged access synchronous bus interface module 112 providing connections to the processor (not shown) and external memory (not shown). Optionally, a memory map decoder 210 connected to tagged access synchronous bus 114 generates selects to slaves and status through arbiter 126a to the bus masters connected to tagged access synchronous bus interface module 112. The advantage of a centralized decoder 210 is in keeping the memory map in one file instead of each slave decoding their own map and in having controller cacheable, bufferable memory mapping and error checking in one module instead of distributed among the slaves. However, either centralized or distributed decode may be utilized. Tagged access synchronous bus 114 includes either a variable width data bus, a variable width address bus, and a tag/status bus, with all signals controlled synchronous to a single edge of the clock. The address and data bus size are system design dependent.

Even though tagged access synchronous bus 114 is synchronous, tagged access synchronous bus interface module 112 to the processor and external memory need not be synchronous to tagged access synchronous bus 114. Thus, tagged access synchronous bus 114 could operate at 125 MHz while the external memory operates at 100 MHz. This is accomplished through buffered interfaces described in greater detail below.

Communications among the components depicted in FIG. 2 are generally as follows: Arbiter 126a grants the address bus and data bus within tagged access synchronous bus 114 separately. When the data bus changes masters, arbiter 126a ensures (for a tri-state bus) that a non-overlap clock cycle exists between one master getting off the bus and a subsequent master driving onto the bus. Addresses will be issued at a theoretical maximum of every other clock cycle, although for scalability purposes the period required for a handshake between a master driving the address and the slave or decoder response will present a more practical limit. Additionally, unidirectional buses may be employed to eliminate the non-overlap cycle.

Master mode devices connected to tagged access synchronous bus 114 may dispatch addresses on the address bus for read and/or write operations with a designated primary or secondary priority. Master devices may also request a change of priority for a previously issued tag, and may be capable of initiating an emergency priority for a previously issued tag, for instances where system failure may result if the associated request is not immediately serviced.

Slave mode devices connected to tagged access synchronous bus 114 may issue three different bus status signals for peer-to-peer operations. The first is a bus status of busy to a requesting master, with no retry required since the address and tag are queued and the slave will notify the master when ready. This may be employed only on peer-to-peer operations, since the memory controller can handle all other tags and requests. Slaves may also issue bus status of slave ready for a specific tag to a master or of busy, with retry required because the address queue is full, again for peer-to-peer operations only. Slaves may also issue data bus requests to write data for a specific tag, and issue the bus status of invalid operation requested, for master/slave operations.

Masters and slaves connected to tagged access synchronous bus 114 will have access to the request/status bus 212a–212b connected to arbiter 126a for issuing requests/status. Bus controller and arbiter 126a issues data bus and address bus grants. Moreover, the tag and status bus (A_ST []) within tagged access synchronous bus 114 is driven by controller/arbiter 126a and is global to all master/slave devices connected to tagged access synchronous bus 114. The tag and status bus has two distinct phases. In the first phase, an Address Valid (AV) signal is active, the address bus contains an address, the control signals are valid, and the A_ST[] bus contains only a tag for the associated address. In phase two, AV is not active and the A_ST[] bus contains both a tag and corresponding status.

Controller/arbiter 126a may assign a tag to the address currently on the address bus by placing the tag on the A_ST[] bus when the AV signal is active. For peer-to-peer operations, controller/arbiter 126a may signal on the status and tag bus three signals: slave busy for tag nnn, retry required; slave busy for tag nnn, wait for slave ready; and slave ready for tag nnn. Controller/arbiter 126a may also signal that the slave for tag nnn is a size smaller than the data bus, that the address at tag nnn is not cacheable, that the address at tag nnn is not bufferable, that tag nnn is an invalid address and/or operation, or signal that tag nnn is reusable (available). Controller/arbiter 126a may also set an emergency priority for the transaction employing tag nnn.

If memory map decoder 210 is not implemented as a separate component, then each slave will need to establish communications to the bus controller/arbiter 126a for anything used in the system, including a signal that slave sss was selected by a previous address, that the previous address is not valid, or that the previous address is not cacheable and/or bufferable.

Data cache responses to controller/arbiter 126a include signals that the transaction including tag nnn is a cache hit/miss or that the data associated with tag nnn was purged with or without copy back. Other interface signals to controller/arbiter 126*a* include request of the data bus for write of data for tag nnn or an update of tag nnn priority to priority xx.

Figure 3:
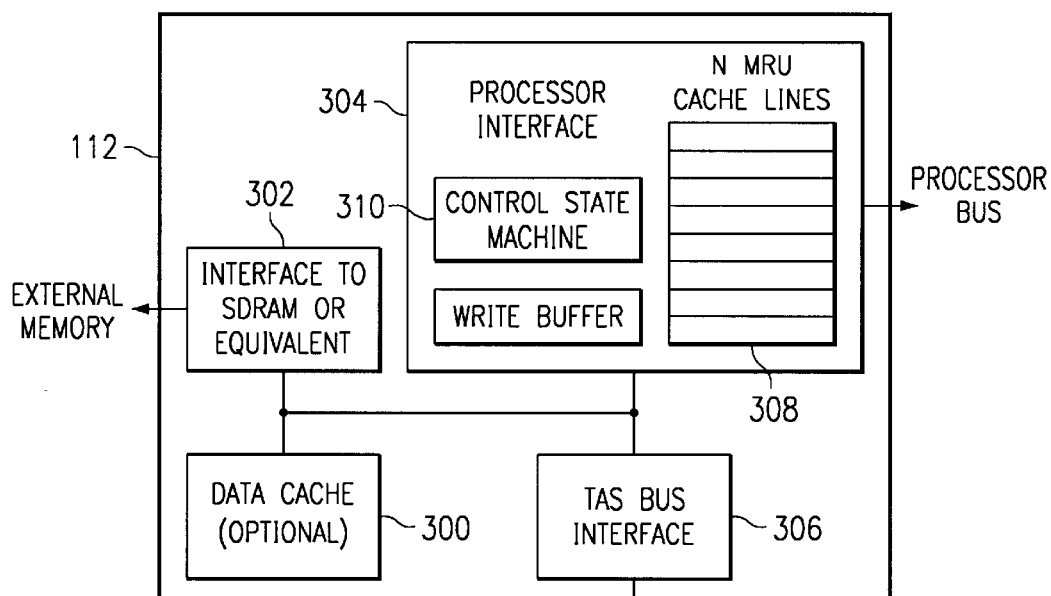
FIG. 3 depicts a diagram of a tagged access synchronous bus interface module in accordance with a preferred embodiment of the present invention.

With reference now to FIG. 3, a diagram of a tagged access synchronous bus interface module in accordance with a preferred embodiment of the present invention is depicted. Interface module 112 optionally includes data cache 300, an interface 302 to the SDRAM or an equivalent external memory, an interface 304 to the processor, and an interface 306 to the tagged access synchronous bus. As previously described, the processor may execute instructions received from the SDRAM. If the processor executes from the SDRAM, a cache line is read, critical word first, into one of the line buffers 308 in processor interface 304, preferably the least recently used. This cache line will not be cached by data cache 300 but instead will be cached, as appropriate, by the instruction cache 106 connected to the processor local bus 110 depicted in FIG. 1. The processor local bus is immediately released when the first word is available in the line, and the line continues to fill from there. A flag may be set within control logic 310 instructing control logic 310 to look-ahead on the address if a line has been read for execution. Control logic 310 may then request the next block from memory to fill another line buffer in anticipation of the processor needing these instructions. Such look ahead operations by control logic 310 may help minimize pipeline stalls in the processor.

If the processor reads data from the SDRAM or equivalent external memory, a line buffer within line buffers 308 is filled, critical word first, and the line is also (optionally) cached in data cache 300. The processor is again released as soon as the first word arrives.

The processor interface 304 may have only one outstanding load address for either instructions or data, or may have two outstanding addresses for loading, one for an instruction and one for data. Multiple delayed loads—the ability of a processor to issue an address for data to be loaded into a register and scoreboard the register so that, if an instruction references that register as a source address, the pipeline stalls, but otherwise the instructions continue to execute—will dispatch a limited number of data addresses, scoreboarding each register, and will only stall if an instructions references one of the registers as a source operand or if the maximum number of delayed loads is reached. The processor includes the capability to accept data and write the register, clearing the scoreboard. In transactions from the SDRAM, the processor has priority over addresses presented from the tagged access synchronous bus interface 306, other than emergency priorities. Where two outstanding addresses are supported in processor interface 304, the data address has priority over the instruction address.

Figure 4:
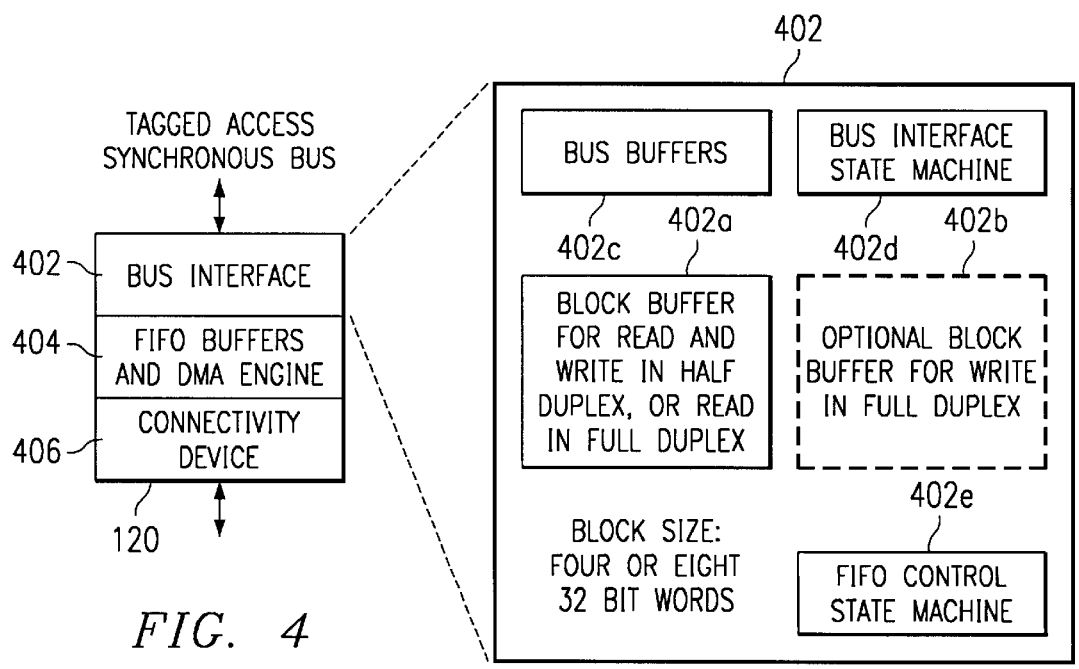
FIG. 4 is a diagram of the buffered interfaces employed in connecting peripherals to a tagged access synchronous bus in accordance with a preferred embodiment of the present invention.

Referring to FIG. 4, a diagram of the buffered interfaces employed in connecting peripherals to a tagged access synchronous bus in accordance with a preferred embodiment of the present invention is depicted. The buffered interfaces in accordance with the present invention are implemented within a master or slave peripheral device and connect the tagged access synchronous bus to different protocol buses such as Ethernet, Peripheral Component Interconnect (PCI), Small Computer Serial Interface (SCSI), etc.

The buffered interface may be implemented for peripheral interface 120 depicted in FIG. 1 as shown, and may also be implemented for peripheral interface 118 or other peripheral interfaces to the tagged access synchronous bus of the present invention. The buffered peripheral interface 120 includes a tagged access synchronous bus interface 402, FIFO buffers and direct memory access (DMA) engine 404, and connectivity device 406.

The core for connectivity device 406 for a master or slave device employing buffered peripheral interface 120 need not necessarily be redesigned to interface with the tagged access synchronous bus of the present invention. FIFO buffers and DMA engine 404 may directly interface to whatever type of bus or control ports currently exist on connectivity device 406. The other side of FIFO buffers and DMA engine 404 is a standard interface 402 to the tagged access synchronous bus. FIFO buffers and DMA engine 404 include FIFO buffers of a size determined by the transfer burst rate, a size which would typically range from 1-3 times the bus block size.

Bus interface 402 preferably contains as few gates as possible, and will typically comprise a small DPRAM with less than one thousand gates. Bus interface 402 basically comprises a bus block buffer 402*a* for half duplex operation (only read or write during a given cycle) or optionally includes an additional bus block buffer 402*b* for full duplex operation (read and write simultaneously). Only the highest speed devices would require full duplex operation, so that one channel may be transferring data while the other is accessing the bus.

Bus interface 402 also includes bus buffers 402*c*, a bus interface state machine 402*d*, and FIFO control state machine 402*e*. Although transactions on the tagged access synchronous bus are synchronous, the backend of bus interface 402 may be an asynchronous handshake or synchronous at a much lower clock rate than the tagged access synchronous bus. The buffering provided by bus interface 402 allows devices of varying clock rates to reside on the same bus.

The tagged access synchronous bus of the present invention employs signals summarized in Tables IIA and IIB. The list contained in Tables IIA and IIB is not necessarily complete. Specific implementations of a tagged access synchronous bus architecture in accordance with the present invention may include additional signals or vary the specific use of the signals described.

TABLE II

| Signal Name | Description |
| --- | --- |
| A[31:2] | Address bus, can only be driven every other clock cycle to allow a cycle of non-overlap, driven by current Address Bus (AB) master. A non-zero value in address bits 2-4 indicate a critical word first request. For example, if the block size is 8 and the value is 6 the words will be read as 6-7-0-1-2-3-4-5. Address 1 and 0 are taken care of on data bus writes with the BEN[3:0] control signals. 64 bit devices would ignore A[2]. |
| R/-W | Read request if high, write request if low. |
| A_ST[x:0] | Address bus tag and status, driven by the arbiter. Issues tags for reads or writes and reflects status of outstanding tags. |
| M/-IO | Memory access requested if high, I/O access requested if low. |
| BCLK | Central clock from which all timing is derived. |
| C | Cacheable control bit. |
| B | Bufferable control bit. |
| P/-V | Optional control bit for physical or virtual address. |

TABLE II-continued

| Signal Name | Description |
| --- | --- |
| AV | Address Valid, the current bus cycle contains a valid address. |
| PCE | Purge Cache Entry. If this block address is in the cache and the cacheable signal is not active, upon completion of the block read, set this block invalid in the cache and ignore copy back, OR if this block address is in the cache and the cacheable signal is active, upon completion of the block read, copy back to memory and set this cache line as invalid. |
| 4/-8 | Block size of four or eight 32 bit words. |
| 32/-64 | Requests a read of 32 or 64 bits. Response for read is on the data bus Requests for write of 64 bit may result in a slave response of 32 bit only. |
| D[31:0] | Data bus, driven by the current Data Bus (DB) master. Minimal data interface for all slaves. |
| D[63:32] | Optional upper word, driven by the current DB master if the slave can accept 64 bit data. |
| D_ST[x:0] | Data bus tag and status, driven by the current DB master. Besides the tag for the data, the status includes the word address within the block and data bus size (32 or 64). |
| LAST | Indicates early termination of the block transfer, one more word is read, or this is the last word written. Driven by the current DB master. |
| BEN[3:0] | Byte enables, driven by the current DB master. Indicates valid data on the individual bytes of the bus. |
| BEN[7:4] | Optional upper word byte enables. |
| DV | Data valid. |

The byte written is controlled by the byte enable signals of the data bus. On reads, all four byte enable (BEN) signals are active. Normally additional address bits by the block size would not be needed since all blocks could start at zero. Since critical word first is supported, however, these lower address signals indicate the critical word. A control signal to select memory or I/O is available and the data is automatically non-cacheable if I/O is selected. Control signals for cacheable and bufferable data transfers are also available. Cacheable and bufferable may be assumed unless otherwise set. The data bus may be 32 or 64 bit and each device will indicate to the arbiter if it can only handle 32 bits. The data master must be capable of reading or writing in 32 bits if necessary.

Figure 5:
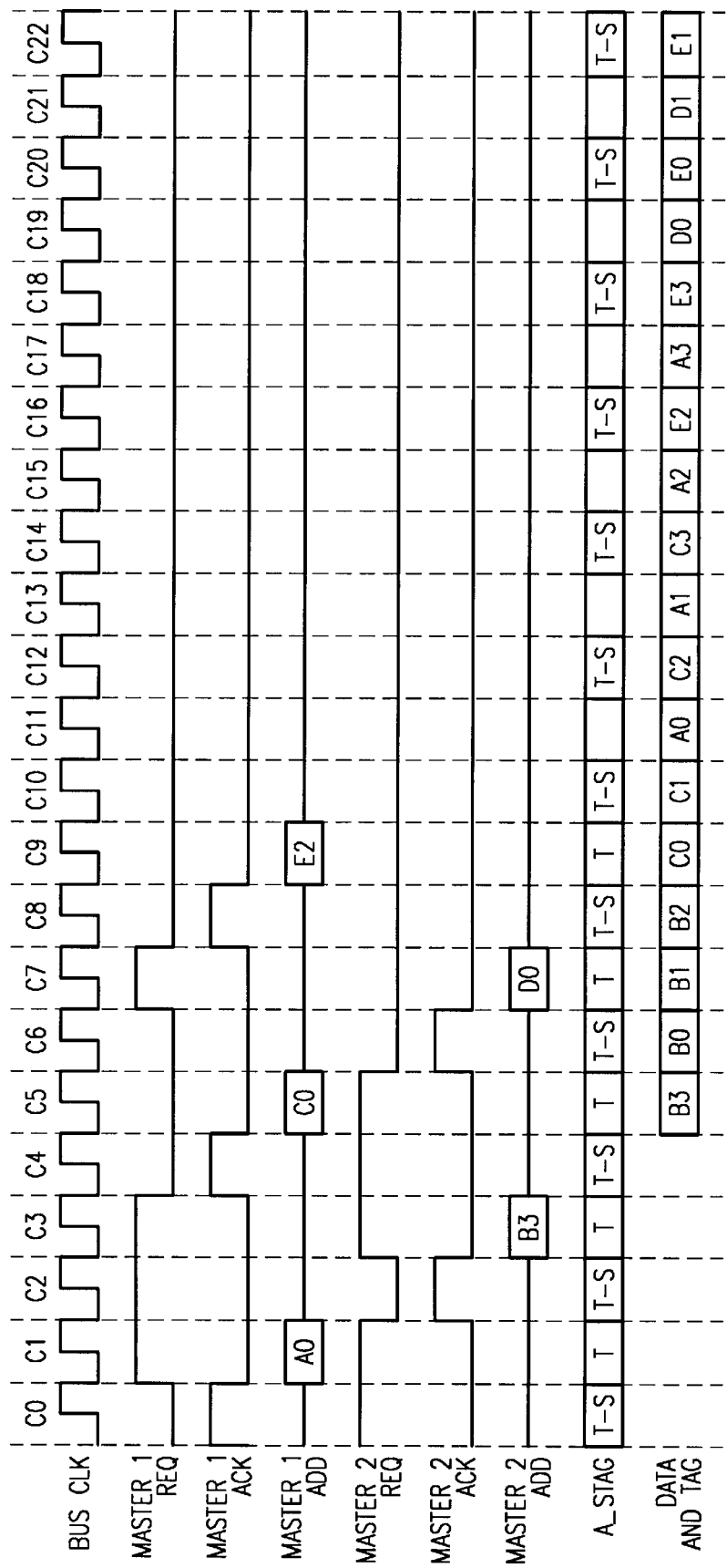
FIG. 5 depicts a timing diagram for transactions on a tagged access synchronous bus in accordance with a preferred embodiment.

With reference now to FIG. 5, a timing diagram for transactions on a tagged access synchronous bus in accordance with a preferred embodiment of the present invention is depicted. As previously discussed, the tagged access synchronous bus of the present invention allows for multiple addresses from multiple devices to be queued by the memory interface so that intelligent decisions for memory management may be made. optimizing writes is possible in any bus since the address and data are in one direction, so that the data and associated address may be buffered and the bus master released immediately while the data is written to memory in the background. The tagged access synchronous bus architecture of the present invention buffers writes.

The main difference of the tagged access synchronous bus architecture over other architectures relates to reads. The bus master cannot complete a read transaction until data is actually returned, which may be many clocks of delay while external memory is accessed. Thus, the tagged access synchronous architecture allows reads to be queued as illustrated in FIG. 5.

The transactions depicted in FIG. 5 are for a memory interface which is half the size of the bus (i.e., if the bus is 32 bit, the memory is 16 bit). The bus interface is assumed to contain a data cache, preferably a copy back type as previously described. Addresses A and D are assumed to be cache misses while B, C, and E are cache hits for a 60% hit ratio. The external memory is assumed to run at the same clock rate as the bus, but by being half the width still requires two reads of memory for one write of the bus. The requests for addresses A, C, and D are requesting the block in order, while requests for addresses B and E are requesting a critical word first.

During clock cycle C0 in FIG. 5, master 1 starts the sequence when the arbiter grants the address bus for the next cycle. During clock cycle C1, master 1 issues a read request for address A word 0 and the arbiter issues a tag for this request. During clock cycle C2, address A is examined by the cache and determined to be a cache miss. master 2 is granted the address bus for the next cycle. During clock cycle C3, master 2 requests a read of address B word 3 (critical word first), the arbiter tags this address, and an external memory access starts (RAS) for address A.

During clock cycle C4, the cache determines address B is a cache hit and master 1 is granted the address bus for the next cycle. During clock cycle C5, data from the cache for address B3 is written to the bus, master 1 requests a read of address C word 0, and the arbiter tags the request by master 1. During clock cycle C6, data from the cache for address B0 is written to the bus, address C is examined by the cache and determined to be a hit, master 2 is granted the address bus for the next clock cycle, and CAS for address A is begun.

During clock cycle C7, data from the cache for address B1 is written to the bus, address C is queued until address B completes since address B is an earlier address, master 2 requests a read of address D word 0, and the arbiter tags this address. During clock cycle C8, data from the cache for address B2 (final word) is written to the bus, master 1 is granted the address bus for the next cycle, the arbiter marks the tag used for address B as reusable and issues this status to the A_ST[] bus, and address D is examined by the cache and determined to be a miss. During clock cycle C9, data from the cache for address C0 is written to the bus, master 1 requests a read of address E word 2, the arbiter tags this read request, the first half word of address A is read from external memory, and address D is determined to be an alternate bank address and is queued by the SDRAM controller.

During clock cycle C10, data from the cache for address C1 is written to the bus, the second half word of address A0 is read and queued for the next bus cycle since address A is older than address C, and address E is examined by the cache and determined to be a hit. During clock cycle C11, data for address A0 is written to the bus, the first half word of address A1 is read from external memory, RAS to an alternate bank of SDRAM for address D0 is begun, and address E is queued. During clock cycle C12, data from the cache for address C2 is written to the bus, and the second half word of address A1 is read from external memory and queued for writing the next cycle.

During clock cycle C13, data for address A1 is written to the bus, and the first half word of address A2 is read from external memory. During clock cycle C14, data from the cache for address C3 (final word) is written to the bus, the second half word of address A2 is read from external memory and queued for the next write, the arbiter marks the tag for address C as reusable and issues this status to the A_ST[] bus, and CAS to the SDRAM for address D is begun. During clock cycle C15, data for address A2 is written to the bus, the first half word of address A3 is read from external memory and, since no accesses to this bank are pending a precharge is issued.

During clock cycle C16, data from the cache for address E2 (critical word first) is written to the bus and the second half word of address A3 is read and queued. During clock cycle C17, data for address A3 is written to the bus, the first half word of address D0 is read from external memory, and the arbiter marks the tag used for address A as reusable and issues this status on the A_ST[] bus. During clock cycle C18, data from the cache for address E3 is written to the bus, the second half word of address D0 is read from external memory and queued. During clock cycle C19, data for address D0 is written to the bus, the first half word of address D1 is read from external memory, and the SDRAM bank used for address A is precharged and ready for use.

During clock cycle C20, data from the cache for address E0 is written to the bus, and the second half word of address D1 is read from memory and queued. During clock cycle C21, data for address D1 is written to the bus and the first half word of address D2 is read from external memory. During clock cycle C22, the data from the cache for address E1 is written to the bus, the second half word of address D2 is read and queued, and the arbiter marks the tag used for address E as reusable and issues this status on the A_ST[] bus. During subsequent clock cycles, the remaining blocks D2 and D3 of the requested read for address D are retrieved from external memory and written to the bus as available.

The bus transactions depicted in FIG. 5 takes 25 clocks to read 20 words of data. This is not the worst case, but is closer to the best case. If optimization of accesses did not take place and the data would be read sequentially, taking 47 clocks. This is a savings of 22 clocks. However, the ability to optimize bus transfers is totally dependent on queuing multiple addresses. If the bus is lightly loaded, the bus interface has little opportunity to optimize accesses; as loading peaks, so does the number of addresses read and the ability to optimize bus transfers. Since data is normally written to a copy back cache and only when the cache line is being replace to memory, accesses to external memory will also overlap cache accesses.

Figure 6A:
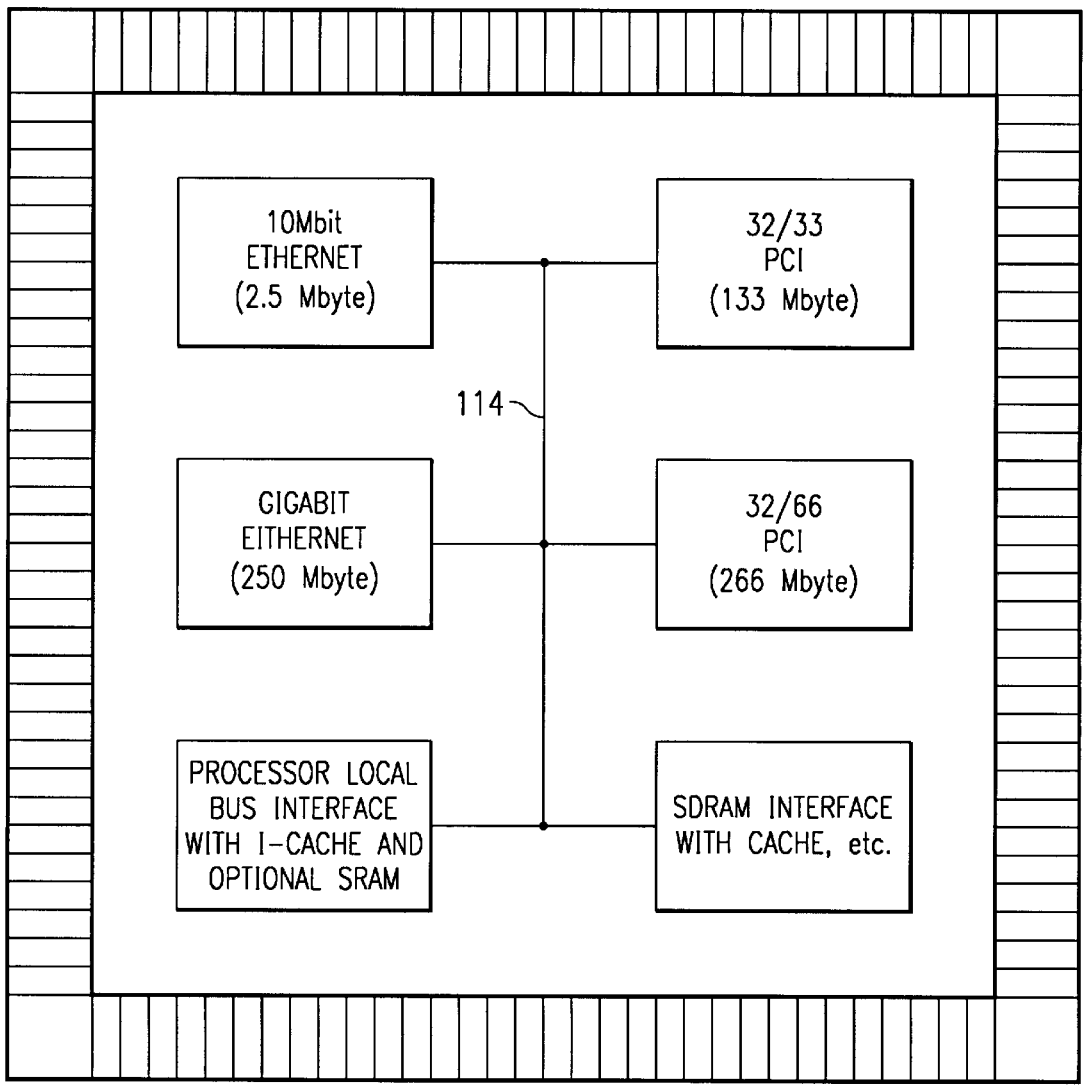
FIGS. 6A–6B are layout diagrams for a die including a tagged access synchronous bus in accordance with a preferred embodiment of the present invention.
Figure 6B:
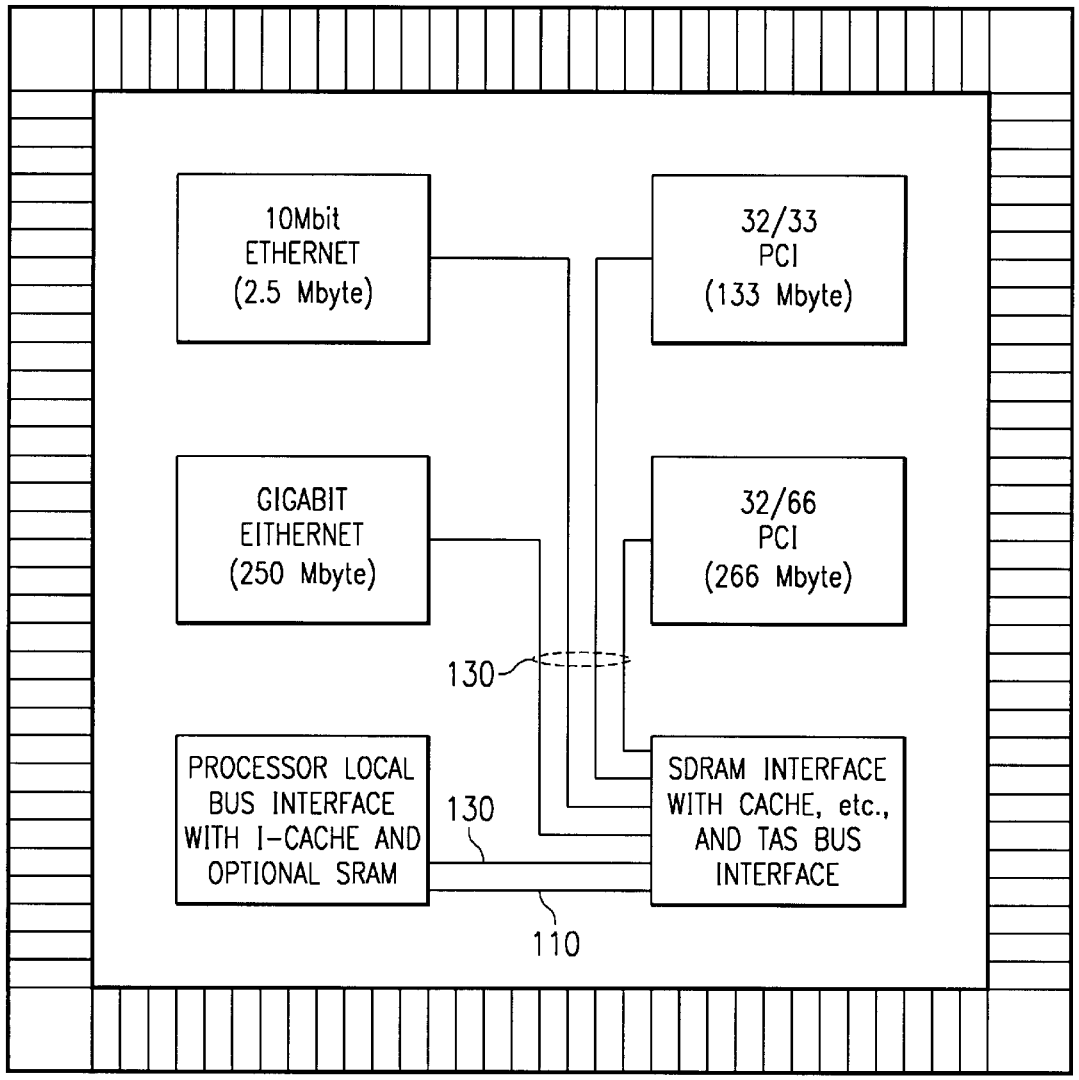

FIGS. 6A—6B are layout diagrams for a die including a tagged access synchronous bus in accordance with a preferred embodiment of the present invention. FIG. 6A shows a typically layout of multiple master cores connected to tagged access synchronous bus 114. The processor interface to tagged access synchronous bus 114 is contained within the processor local bus block, and the SDRAM interface to tagged access synchronous bus 114 is contained within the SDRAM block. Each of the master cores for the peripherals—10 Mbit and Gigabit Ethernet and 32/33 and 32/66 PCI—include peripheral interfaces to tagged access synchronous bus 114. The peak Mbyte transfer rates for the various cores are indicated in parentheses.

Tagged access synchronous bus 114 is expected to be an extremely high performance bus, on the order of at least 100–200 MHz. With tagged access synchronous bus 114 stretching the length of the die, driving the capacitance of tagged access synchronous bus 114 at those frequencies becomes nearly impossible.

In the exemplary embodiment of the buffered peripheral interfaces, a bus interface segment between the FIFO buffers of a peripheral device and the tagged access synchronous bus was depicted and described. These blocks of logic may be incorporated in the SDRAM interface block depicted in the lower right corner of FIG. 6B, together with the processor interface to the processor local bus. This allows the tagged access synchronous bus to be very short and contained completely within the SDRAM interface block. The remaining logic for the peripheral cores is connected to the SDRAM interface block via processor peripheral bus 130, and the processor interface core is connected to the SDRAM interface block via processor local bus 110 and processor peripheral bus 130. Processor peripheral bus 130, which now runs the length of the die, may much slower and therefore easier to drive with the associated capacitances.

Typical data transfer buses are currently operating at 200–300 Mbyte peak rates with a sustainable rate of 100—180 Mbyte. The tagged access synchronous bus architecture of the present invention would provide a 500 Mbyte peak rate with a sustainable data transfer rate of 300–350 Mbyte. This is advantageous in Gigabit Ethernet networks and other high speed data movement systems. Although described with SDRAM in the exemplary embodiment, the tagged access synchronous bus architecture of the present invention may be employed with RDRAM and other equivalent types of memory.

The tagged access synchronous bus of the present invention gives optimal performance to data transfer with minimum impact on processor performance. The use of a tagged access synchronous bus with the processor local bus significantly increases the system performance as compared to a single bus system in which the processor depends on the sole bus for information. The dual port memory system, with memory and processor ports to the tagged access synchronous bus and data cache, allows the processor to execute closer to its maximum rate while 300 Mbytes or more of data is transferred in the system.

Positioning the data cache central to the tagged access synchronous bus and the processor local bus ensures data coherency. Also, allowing selective purging of the cache increases the cache efficiency and provides data flow control to the programmer.

The use of buffered interfaces on all tagged access synchronous bus devices allows the devices to operate asynchronous to the bus. Using half or full duplex peripheral device interfaces to the tagged access synchronous bus allows the tagged access synchronous bus to be very short for maximum operating frequency. The asynchronous backend to peripheral device interfaces allows slower devices to be floorplanned further away from the tagged access synchronous bus on the die, while faster devices are placed closer to the tagged access synchronous bus.

The use of tagged reads and writes buffering allows the external memory interface to make logical performance decisions based on overall needs. Furthermore, the ability to handle multiple addresses extends the tagged access synchronous bus capabilities for future generation devices.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A tagged access synchronous bus architecture, comprising:
a bus coupled to at least one data storage peripheral; and
an arbiter coupled to the bus and assigning a reusable tag to each access request on the bus for data stored within the at least one data storage peripheral,
wherein a requesting device requests access to data stored within the at least one data storage peripheral, receives a reusable tag for the request, and monitors subsequent transactions on the bus for the reusable tag assigned to the request.

2. The bus architecture of claim 1, wherein the reusable tag comprises a 3 bit tag.

3. The bus architecture of claim 1, wherein the requesting device requests access to data within the at least one peripheral by transmiting a starting address for requested data on the bus.

4. The bus architecture of claim 1, wherein requests for access to data within the at least one peripheral on the bus are treated as requests for a block of data equal in size to a cache line.

5. The bus architecture of claim 1, wherein requests for access to data within the at least one peripheral on the bus are treated as requests for four 32 bit words of data.

6. The bus architecture of claim 1, wherein requests for access to data within the at least one peripheral on the bus include an address treated as a starting address for a block of data equal in size to a cache line.

7. The bus architecture of claim 1, wherein:
a first request for access to data within the at least one peripheral is assigned a first reusable tag;
a second request for access to data within the at least one peripheral is assigned a second reusable tag;
data for the first request is transmitted with the first reusable tag on the bus; and
data for the second request is transmitted with the second reusable tag on the bus.

8. The bus architecture of claim 1, further comprising:
a first master coupled to the bus and transmitting a first request on the bus for access to data within the at least one peripheral, wherein the arbiter assigns a first reusable tag to the first request and the first master monitors subsequent data transactions on the bus for the first reusable tag; and
a second master coupled to the bus and transmitting a second request on the bus for access to data within the at least one peripheral, wherein the arbiter assigns a second reusable tag to the second request and the second master monitors subsequent data transactions on the bus for the second reusable tag.

9. The bus architecture of claim 8, wherein the first master transmits a third request on the bus for access to data within the at least one peripheral, the arbiter assigns a third reusable tag to the third request, and the first master monitors subsequent data transactions on the bus for the third reusable tag.

10. The bus architecture of claim 1, wherein the arbiter assigns a priority to each access request on the bus for data stored within the at least one data storage peripheral.

11. The bus architecture of claim 10, wherein data transfers on the bus in response to access requests are ordered by a priority assigned to a corresponding access request.

12. The bus architecture of claim 10, wherein a priority assigned to an access request on the bus may be increased by the arbiter.

13. The bus architecture of claim 12, wherein the priority assigned to an access request on the bus is increased by the arbiter with time.

14. The bus architecture of claim 1, further comprising:
a data cache coupled to the bus, wherein the data cache stores cache lines transferred on the bus.

15. The bus architecture of claim 1, further comprising:
an external memory coupled to the bus, wherein the external memory stores cache lines transferred on the bus.

16. The bus architecture of claim 1, further comprising:
a processor coupled to the bus, wherein the processor initiates access requests on the bus.

17. A tagged access synchronous bus architecture, comprising:
a bus coupled to at least one data storage peripheral;
an arbiter coupled to the bus and assigning a reusable tag to each access request on the bus for data stored within the at least one data storage peripheral,
wherein a requesting device requests access to data stored within the at least one data storage peripheral, receives a reusable tag for the request, and monitors subsequent transactions on the bus for the reusable tag assigned to the request; and
wherein requests for access to data within the at least one peripheral on the bus further comprise:
an address for data within the at least one peripheral, wherein a first portion of the address is utilized as a starting address for a block of data equal in size to a cache line and a second portion of the address is utilized to determine a first portion of the block of data to be transmitted in response to the access request.

18. A data processing system, comprising:
a bus;
at least one data storage peripheral coupled to the bus;
a memory coupled to the bus;
a processor coupled to the bus; and
an arbiter connected to the bus, wherein the arbiter assigns a reusable tag to each access request on the bus for data stored within the at least one data storage peripheral or the memory,
wherein a requesting device requests access to data stored within the at least one data storage peripheral or the memory, receives a reusable tag for the request, and monitors subsequent transactions on the bus for the reusable tag assigned to the request.

19. The data processing system of claim 18, further comprising:
a first master coupled to the bus and transmitting a first request on the bus for access to data within the at least one peripheral or the memory, wherein the arbiter assigns a first reusable tag to the first request and the first master monitors subsequent data transactions on the bus for the first reusable tag; and
a second master coupled to the bus and transmitting a second request on the bus for access to data within the at least one peripheral or the memory, wherein the arbiter assigns a second reusable tag to the second request and the second master monitors subsequent data transactions on the bus for the second reusable tag.

20. The data processing system of claim 19, wherein data for the second request is transmitted on the bus prior to data for the first request.

21. The data processing system of claim 19, wherein portions of data for the second request are transmitted on the bus overlapping with portions of data for the first request transmitted on the bus.

22. The data processing system of claim 18, further comprising:

a cache coupled to the bus, the cache configured to copy back data to the memory when replaced within the cache.

23. The data processing system of claim 18, further comprising:

a write buffer for staging data writes from a cache coupled to the bus to the memory.

24. The data processing system of claim 18, wherein the bus and interfaces to the bus are contained within a single integrated circuit device within the data processing system.

25. The data processing system of claim 24, wherein the bus spans less than half a length of a die containing the bus and interfaces to the bus.

26. A data processing system, comprising:

a bus;

at least one data storage peripheral coupled to the bus;

a memory coupled to the bus;

a processor coupled to the bus; and an arbiter connected to the bus, wherein the arbiter assigns a reusable tag to each access request on the bus for data stored within the at least one data storage peripheral or the memory, wherein a requesting device requests access to data stored within the at least one data storage peripheral or the memory, receives a reusable tag for the request, and monitors subsequent transactions on the bus for the reusable tag assigned to the request; and wherein access requests on the bus include an address, a first portion of the address utilized to locate a block of data equal in size to a cache line containing data requested by a corresponding access request.

27. The data processing system of claim 26, wherein the block of data is transmitted on the bus in response to the corresponding access request.

28. The data processing system of claim 26, wherein a second portion of the address is utilized to determine a portion of the block of data to be transmitted first on the bus in response to the corresponding access request.

29. The data processing system of claim 28, wherein the block of data is transmitted on the bus in response to the corresponding access request with the portion of the block of data being transmitted first.

30. A method of improving data transfer performance within a data processing system, comprising:

coupling a bus to an arbiter assigning reusable tags to data access requests on the bus;

responsive to detecting a data access request on the bus, assigning a reusable tag to the data access request; and responsive to assignment of the reusable tag to the data access request, monitoring data transfers on the bus for the reusable tag.

31. The method of claim 30, further comprising:

responsive to receiving a data request, determining whether requested data is contained within a cache coupled to the bus;

responsive to determining that the requested data is contained within the cache, providing the requested data from the cache within an assigned tag; and responsive to determining that the requested data is not contained within the cache, initiating a data access request on the bus.

32. The method of claim 30, wherein the step of assigning a reusable tag to the data access request further comprises:

assigning a unique, reusable tag to each pending data access request on the bus.

33. The method of claim 30, wherein the step of assigning a reusable tag to the data access request further comprises:

assigning a priority to the data access request.

34. A method of improving data transfer performance within a data processing system, comprising:

coupling a bus to an arbiter assigning reusable tags to data access requests on the bus;

responsive to detecting a data access request on the bus, assigning a reusable tag to the data access request;

responsive to assignment of the reusable tag to the data access request, monitoring data transfers on the bus for the reusable tag;

responsive to detecting the data access request on the bus, extracting an address from the data access request;

utilizing a first portion of the address to locate a block of data equal in size to a cache line and containing requested data; and transmitting the block of data on the bus with the reusable tag.

35. The method of claim 34, wherein the step of utilizing a first portion of the address to locate a block of data equal in size to a cache line and containing requested data further comprises:

locating four 32 bit words of data containing the requested data.

36. The method of claim 34, further comprising:

utilizing a second portion of the address to identify a portion of the block of data equal to be transmitted first; and transmitting the block of data on the bus with the reusable tag with the portion of the block of data first.

37. The method of claim 36, wherein the step of utilizing a second portion of the address to identify a portion of the block of data equal to be transmitted first further comprises:

identifying a word within four 32 bit words to be transmitted first.

\* \* \* \* \*